(12) United States Patent
Moisanen et al.

(10) Patent No.: US 11,303,390 B2
(45) Date of Patent: *Apr. 12, 2022

(54) ENHANCEMENT ON RECEPTION OF STANDALONE SERVICE ACCEPT

(71) Applicant: MEDIATEK Singapore Pte. Ltd, Singapore (SG)

(72) Inventors: Matti Moisanen, Oulu (FI); Jaakko Sitomaniemi, Oulu (FI); Marko Niemi, Oulu (FI)

(73) Assignee: MediaTek Singapore Pte. Ltd., Singapore (SG)

( * ) Notice: Subject to any disclaimer, the term of this patent is extended or adjusted under 35 U.S.C. 154(b) by 104 days.

This patent is subject to a terminal disclaimer.

(21) Appl. No.: 16/919,244

(22) Filed: Jul. 2, 2020

(65) Prior Publication Data

US 2020/0336250 A1    Oct. 22, 2020

Related U.S. Application Data

(63) Continuation of application No. 16/155,198, filed on Oct. 9, 2018, now Pat. No. 10,735,145.

(Continued)

(51) Int. Cl.
*H04L 1/16* (2006.01)
*H04W 76/18* (2018.01)
(Continued)

(52) U.S. Cl.
CPC ............ *H04L 1/1657* (2013.01); *H04W 4/20* (2013.01); *H04W 76/18* (2018.02); *H04W 76/38* (2018.02); *H04W 12/08* (2013.01)

(58) Field of Classification Search
CPC .... H04L 1/1657; H04L 67/143; H04W 76/18; H04W 76/38; H04W 4/20; H04W 12/08; H04W 76/10

See application file for complete search history.

(56) References Cited

U.S. PATENT DOCUMENTS 10,834,570 B2    11/2020  Kim et al.
2012/0182912 A1*  7/2012  Watfa .................. H04W 36/125
                                             370/311

(Continued)

FOREIGN PATENT DOCUMENTS

CN       102026407 A       9/2009
WO    WO2017142363 A1      2/2016
WO    WO2017189067 A1      4/2016

OTHER PUBLICATIONS

3GPP, "3rd Generation Partnership Project; Technical Specification Group Core Network and Terminals; Mobile radio interface Layer 3 specification; Core network protocols; Stage 3", Sep. 2014, 3GPP TS 24.008 V12.7.0 (Year: 2014).*

(Continued)

*Primary Examiner* — Michael K Phillips
(74) *Attorney, Agent, or Firm* — Imperium Patent Works; Zheng Jin

(57) ABSTRACT

A method of supporting reception of standalone SERVICE ACCEPT message is proposed. In one embodiment, a new timer is started when the UE determines successful completion of the service request procedure and has not received SERVICE ACCEPT during the procedure. In an alternative embodiment, an existing timer T3417 or T3417ext can be used to define the allowed time window for the reception of SERVICE ACCEPT. While the timer is running, the UE can treat the SERVICE ACCEPT message as successfully received and the message does not cause protocol error.

18 Claims, 6 Drawing Sheets

Related U.S. Application Data

(60) Provisional application No. 62/635,641, filed on Feb. 27, 2018, provisional application No. 62/573,712, filed on Oct. 18, 2017, provisional application No. 62/571,346, filed on Oct. 12, 2017.

(51) Int. Cl.
*H04W 76/38* (2018.01)
*H04W 4/20* (2018.01)
*H04W 12/08* (2021.01)

(56) References Cited

U.S. PATENT DOCUMENTS

| | | | |
|---|---|---|---|
| 2014/0064209 A1 | 3/2014 | Anchan et al. | 370/329 |
| 2017/0332431 A1 | 11/2017 | Kim et al. | |
| 2018/0049059 A1 | 2/2018 | Kumar et al. | |
| 2019/0053034 A1 | 2/2019 | Kim et al. | |
| 2020/0245242 A1* | 7/2020 | Hoglund | H04W 76/27 |

OTHER PUBLICATIONS

"China IPO, office action and search report for application 201880004866.6", dated Jun. 16, 2021 (Year: 2021).*

Indian IP Office, office action and search report for application 202027020716 dated Jun. 30, 2021 (no English translation is available).

3GPP TS 24.301 V13.6.0 (Jun. 24, 2016) "Non-Access-Stratum (NAS) protocol for Evolved Packet system (EPS); Stage 3 (release 13)", 3GPP, Mobile Competence Centre; 650, Route D, p. 170-186.

China IPO, office action and search report for application 201880004866.6, dated Jun. 16, 2021 (no English translation is available).

3GPP TS 24.301 V13.6.1 (Jun. 30, 2016) "Non-Access-Stratum (NAS) protocol for Evolved Packet system (EPS); Stage 3".

3GPP TS 24.301 V15.0.0 (Sep. 30, 2017) "Non-Access-Stratum (NAS) protocol for Evolved Packet system (EPS); Stage 3 (Release 15)".

European EPO, office action and search report for application 18866623.4-1213/3695654 PCT/CN2018109962, dated Apr. 30, 2021.

3GPP TS 24.301 V13.6.0 (Jun. 24, 2016) "Non-Access-Stratum (NAS) protocol for Evolved Packet system (EPS); Stage 3" (release 13) *p. 170-p. 186*.

Taiwan IPO, office action for the TW patent application 107135971 (no English translation is available) dated Dec. 9, 2019 (9 pages).

3GPP TS 24.301 V13.6.1 (Jun. 2016) "Technical Specification 3rd Generation Partnership Project; Technical Specification Group Core Network and Terminals; Non-Access-Stratum (NAS) protocol for Evolved Packet system (EPS); Stage 3 (Release 13)", *p. 168-197*.

3GPP TS 24.301 V14.5.0 (Sep. 2017) 3rd Generation Partnership Project; Technical Specification Group Core Network and Terminals; Non-Access-Stratum (NAS) protocol for Evolved Packet System)EPS); Stage 3 (Release 14).

Taiwan IPO, office action for the TW patent application 107135971, dated Dec. 9, 2019 English machine language translation (9 pages) (Year 2019).

* cited by examiner

ENHANCEMENT ON RECEPTION OF STANDALONE SERVICE ACCEPT

CROSS REFERENCE TO RELATED APPLICATIONS

This application is a continuation, and claims priority under 35 U.S.C. § 120 from nonprovisional U.S. patent application Ser. No. 16/155,198, entitled "Enhancement on Reception of Standalone Service Accept", filed on Oct. 9, 2018, the subject matter of which is incorporated herein by reference. Application Ser. No. 16/155,198, in turn, claims priority under 35 U.S.C. § 119 from U.S. Provisional Application No. 62/571,346, entitled "Allowed window for reception of standalone SERVICE ACCEPT", filed on Oct. 12, 2017; U.S. Provisional Application No. 62/573,712, entitled "Allowed window for reception of standalone SERVICE ACCEPT", filed on Oct. 18, 2017; U.S. Provisional Application No. 62/635,641, entitled "Allowed window for reception of standalone SERVICE ACCEPT", filed on Feb. 27, 2018, the subject matter of each of the foregoing is incorporated herein by reference.

TECHNICAL FIELD

The disclosed embodiments relate generally to wireless communication, and, more particularly, to method of supporting reception of standalone SERVICE ACCEPT message.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. With the optimization of the network design, many improvements have developed over the evolution of various standards.

When UE needs to establish a connection for service, UE sends a service request, i.e., a SERVICE REQUEST message, an EXTENDED SERVICE REQUEST message, or a CONTROL PLANE SERVICE REQUEST message, to a mobility management entity (MME) via its serving eNB. The service request procedure is considered completed when 1) UE receives a security-protected non-access stratum (NAS) message, e.g. a SECURITY MODE COMMAND message or a SERVICE ACCEPT message, or 2) UE receives an indication from lower layers that the user plane radio bearers are setup. If the service request procedure is considered completed in the UE and the UE receives a SERVICE ACCEPT message afterwards, different methods have been provided.

In Rel-13, the UE considers the SERVICE ACCEPT message is received in wrong protocol state. The network cannot always successfully send SERVICE ACCEPT message to the UE with evolved packet system (EPS) bearer context status information element and the bearer context status information is not synchronized in the UE. In Rel-14, the UE is able to receive and treat a SERVICE ACCEPT message after the service request procedure is determined successfully completed, i.e., after the UE has already received SECURITY MODE COMMAND message or been indicated that the user plane radio bearers are set up. In this special case, the UE shall treat the SERVICE ACCEPT message as it would have been received during the service request procedure, but in all other cases the UE shall still consider the SERVICE ACCEPT message is received in wrong protocol state.

It is not defined of how long after the service request procedure is completed the UE shall accept the SERVICE ACCEPT message, i.e., what is the time window to allow the SERVICE ACCEPT message been successfully received after the service request procedure is completed. A solution is sought.

SUMMARY

A method of UE supporting reception of standalone SERVICE ACCEPT message is proposed. In one embodiment, a new timer is started when the UE determines successful completion of the service request procedure, e.g., when UE receives a SECURITY MODE COMMAND message or an indication from the lower layers that the user plane radio bearers are set up and has not received SERVICE ACCEPT during the procedure. While the timer is running, the UE treats the SERVICE ACCEPT message as successfully received and the message does not cause protocol error. In an alternative embodiment, an existing timer T3417 or T3417ext can be used to define the allowed time window for the reception of SERVICE ACCEPT. While the timer is running, the UE stays in EMM-SERVICE-REQUEST-INITIATED state and does not consider the service request procedure completed. UE can treat the SERVICE ACCEPT message as successfully received and the message does not cause protocol error. At expiry of the timer, the UE leaves EMM-SERVICE-REQUEST-INITIATED state and considers the service request procedure successfully completed.

In one embodiment, a UE transmits a service request to initiate a service request procedure in a mobile communication network. The UE starts a timer upon the service request procedure is completed. The UE accepts a SERVICE ACCEPT message from a mobility management entity (MME) when the SERVICE ACCEPT message is received before expiry of the timer. The UE transmits an error status to the MME when the SERVICE ACCEPT message is received after the expiry of the timer. The UE may stay in a SERVICE-REQUEST-INITIATED state after the service request procedure is completed and before the SERVICE ACCEPT message is received.

In another embodiment, a UE transmits a service request to initiate a service request procedure in a mobile communication network. The UE receives a SECURITY MODE COMMAND message or an indication of a user plane radio bearers are set up. The UE starts a timer upon receiving the SECURITY MODE COMMAND message or the indication of the user plane radio bearers are set up. The UE receives a SERVICE ACCEPT message from a mobility management entity (MME). The UE accepts the SERVICE ACCEPT message when received before expiry of the timer. The UE transmits an error status to the MME when the SERVICE ACCEPT message is received after expiry of the timer.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
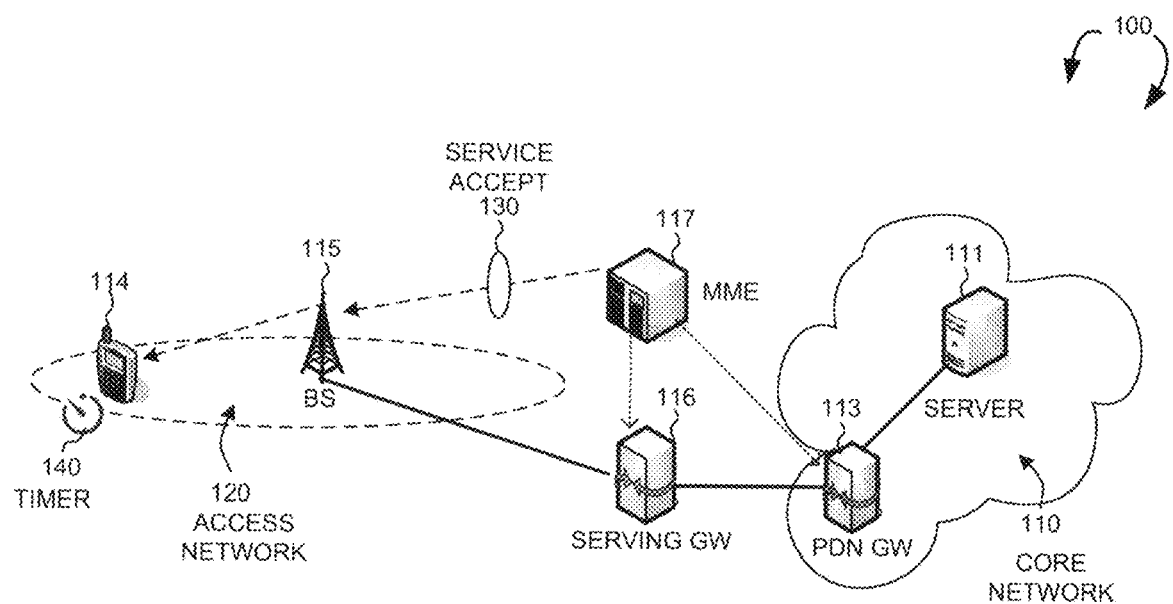
FIG. 1 illustrates an exemplary LTE/NR network supporting reception of standalone SERVICE ACCEPT message in accordance with one novel aspect.

FIG. 1 illustrates an exemplary LTE/NR network 100 supporting reception of standalone SERVICE ACCEPT message in accordance with one novel aspect. LTE/NR network 100 comprises application servers including server 111 that provides various services by communicating with a plurality of user equipments (UEs) including UE 114. In FIG. 1, server 111 and a packet data network gateway (PDN GW or P-GW) 113 belong to part of a core network CN 110. UE 114 and its serving base station BS 115 belong to part of a radio access network RAN 120. RAN 120 provides radio access for UE 114 via a radio access technology (RAT). Server 111 communicates with UE 114 through PDN GW 113, serving GW 116, and BS 115. A mobility management entity (MME) 117 communicates with BS 115, serving GW 116 and PDN GW 113 for mobility management of wireless access devices in LTE network 100. UE 114 may be equipped with a radio frequency (RF) transceiver or multiple RF transceivers for services via different RATs/CNs. UE 114 may be a smart phone, a wearable device, an Internet of Things (IoT) device, a tablet, etc.

LTE and NR networks are packet-switched (PS) IP networks. This means that the networks deliver all data traffic in IP packets, and provide users with Always-On IP Connectivity. When UE joins an LTE/NR network, a Packet Data Network (PDN) address (i.e., the one that can be used on the PDN) is assigned to the UE for its connection to the PDN. LTE/NR calls the UE's "IP access connection" an evolved packet system (EPS) bearer, which is a connection between the UE and the P-GW. The P-GW is the default gateway for the UE's IP access. LTE/NR has defined a Default EPS Bearer to provide the IP Connectivity that is Always-On. UE may establish additional data radio bearers for data communication.

In FIG. 1, when UE 114 needs to establish a connection for service, UE sends a service request to MME 117 via its serving BS 115 to initiate a service request procedure and changes its EPS mobility management (EMM) state to EMM-SERVICE-REQUEST-INITIATED. The service request procedure is considered completed when 1) UE receives an integrity protected non-access stratum (NAS) message, e.g. a SECURITY MODE COMMAND message or a SERVICE ACCEPT message, or 2) UE receives an indication from lower layers that the user plane radio bearers are setup. UE then goes back to EMM-NORMAL-SERVICE state. If the service request procedure is considered completed in the UE and the UE receives a SERVICE ACCEPT message afterwards, it is not defined of how long after the service request procedure is completed the UE shall accept the SERVICE ACCEPT message, i.e., what is the time window to allow the SERVICE ACCEPT message been successfully received after the service request procedure is completed.

In accordance with a novel aspect, a timer 140 is started when the UE determines successful completion of the service request procedure, e.g., when UE receives a SECURITY MODE COMMAND message or an indication from the lower layers that the user plane radio bearers are set up and has not received SERVICE ACCEPT during the procedure. While the timer is running, the UE treats the SERVICE ACCEPT message 130 as successfully received and the message does not cause protocol error. In an alternative embodiment, an existing timer T3417 or T3417ext can be used to define the allowed time window for the reception of SERVICE ACCEPT. While the timer is running, the UE stays on EMM-SERVICE-REQUEST-INITIATED state and does not consider the service request procedure completed. UE can treat the SERVICE ACCEPT message as successfully received and the message does not cause protocol error. At expiry of the timer, the UE leaves EMM-SERVICE-REQUEST-INITIATED state and considers the service request procedure successfully completed.

Figure 2:
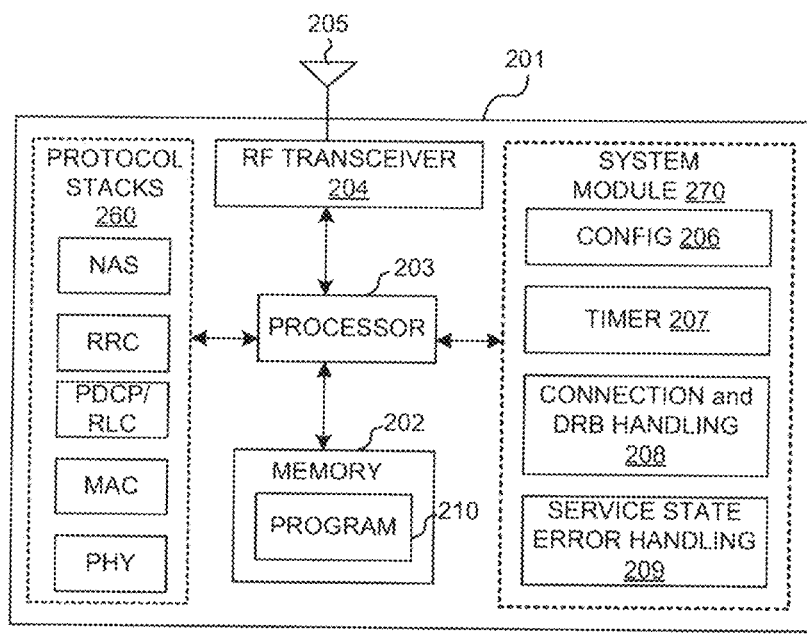
FIG. 2 illustrates simplified block diagrams of a user equipment (UE) and a base station in accordance with embodiments of the current invention.

FIG. 2 illustrates simplified block diagrams of a UE 201 in accordance with embodiments of the current invention. UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of microprocessors, one or more microprocessor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of protocol stacks 260 and control circuits including various system modules and circuits 270 to carry out functional tasks of UE 201. Protocol stacks 260 comprises Non-Access-Stratum (NAS) layer to communicate with a mobility management entity (MME) connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, configuration circuit 206 receives various configuration from the network, timer 207 is configured to facilitate the reception of SERVICE ACCEPT message properly, connection and data radio bearer (DRB) handling circuit 208 handles UE connection and DRB establishment, service state and error handling circuit 209 handles proper EMM state of the UE and corresponding error status.

Figure 3:
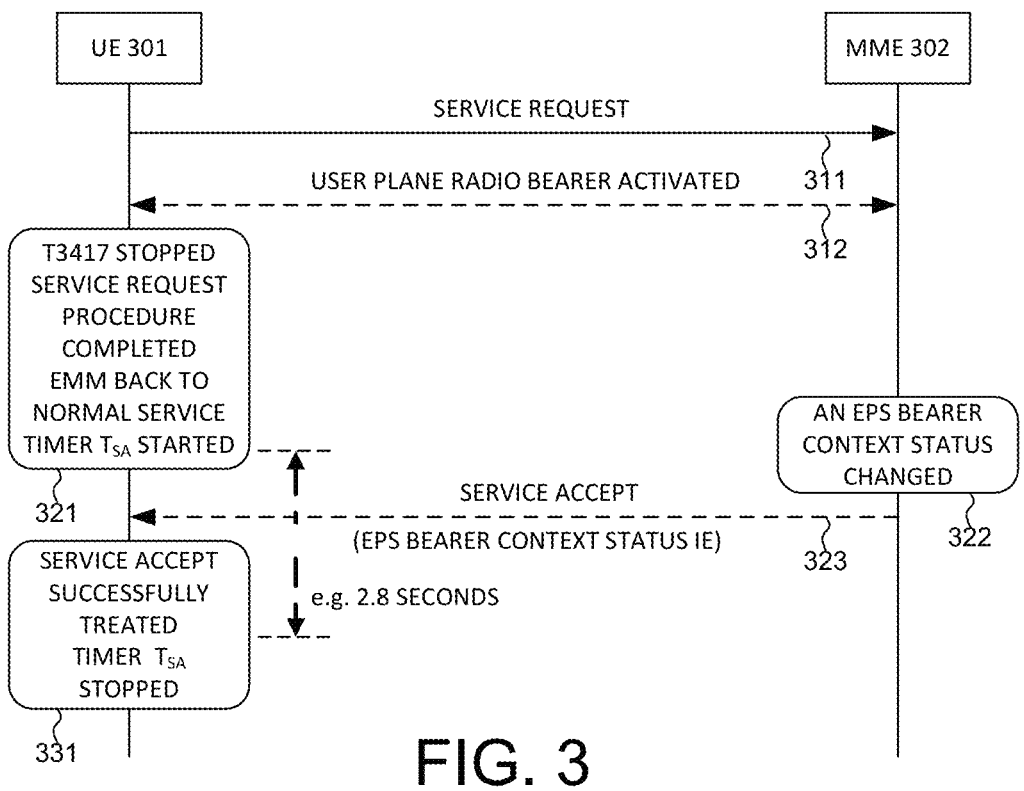
FIG. 3 illustrates a first embodiment of utilizing a new timer for reception of SERVICE ACCEPT in accordance with one novel aspect.

FIG. 3 illustrates a first embodiment of utilizing a new timer for reception of SERVICE ACCEPT in accordance with one novel aspect. In the embodiment of FIG. 3, a new timer is introduced and a SERVICE ACCEPT message is successfully accepted. In step 311, UE 301 sends a service request to MME 302. UE 301 starts T3417 timer and goes to EMM-SERVICE-REQUEST-INITIATED state. In step 312, UE 301 and MME 302 establish and activate user plane radio bearers. In step 321, UE 301 determines that the service request procedure is completed. UE 301 stops T3417 timer and goes back to EMM-NORMAL-SERVICE state. The service request procedure is determined to be completed when the UE has received a SECURITY MODE COMMAND message or an indication from the lower layers that the user plane radio bearers are set up. UE 301 then starts a new timer $T_{SA}$. The new timer $T_{SA}$ is started upon the determination that the service request procedure is completed and the UE has not yet received a SERVICE ACCEPT during the service request procedure. Timer $T_{SA}$ can be configured with a predefined value of e.g. 5 seconds.

In step 322, MME 302 detects that an EPS bearer context status has changed. In step 323, MME 302 sends a SERVICE ACCEPT message to UE 301 together with the EPS bearer context status information element (IE). At this time, timer $T_{SA}$ is still running, e.g., for 2.8 seconds. While timer $T_{SA}$ is still running, the UE treats the SERVICE ACCEPT message as successfully received and the message does not cause protocol error. As a result, in step 331, UE 301 receives the SERVICE ACCEPT message successfully and stops timer $T_{SA}$. UE 301 can also update the EPS bearer context status and keep being in sync with the network. In this embodiment, although MME 302 is not able to send the SERVICE ACCEPT message before the completion of the service request procedure, UE 301 is able to successfully receive the message and update the EPS bearer context status using the new timer $T_{SA}$.

Figure 4:
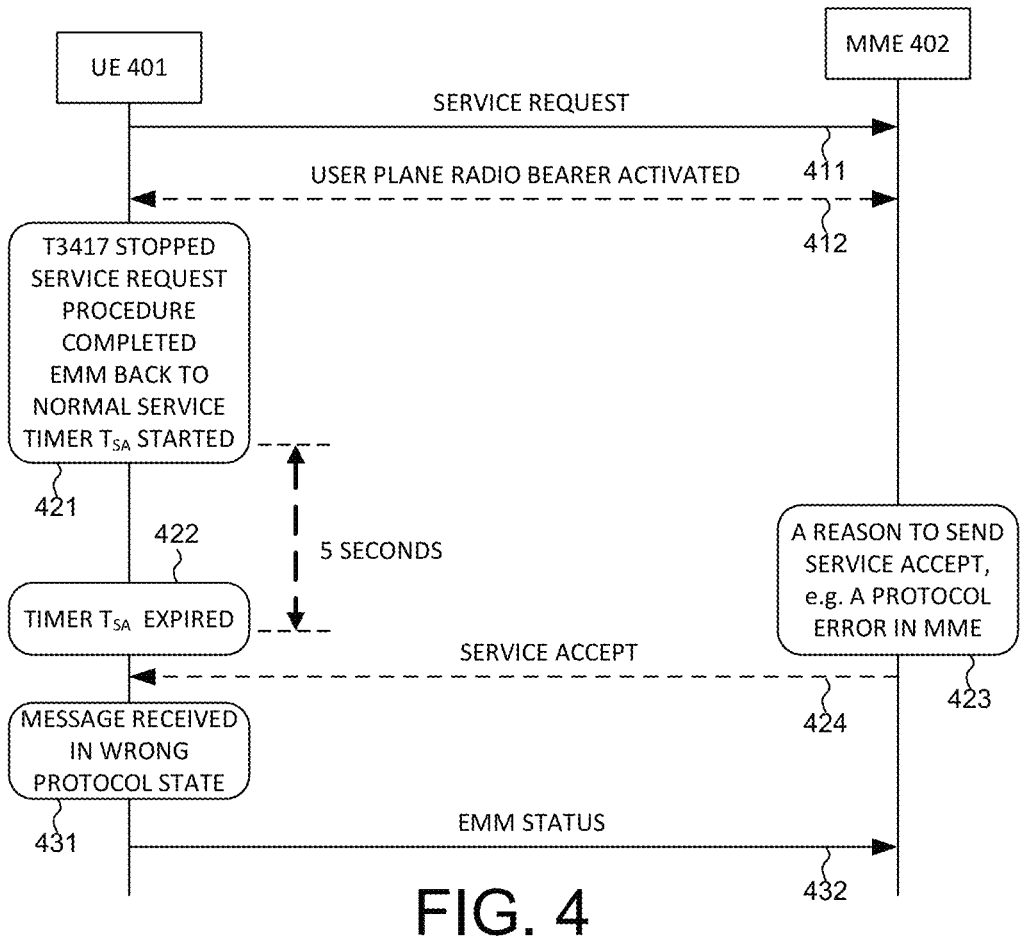
FIG. 4 illustrates a second embodiment of utilizing a new timer for reception of SERVICE ACCEPT in accordance with one novel aspect.

FIG. 4 illustrates a second embodiment of utilizing a new timer for reception of SERVICE ACCEPT in accordance with one novel aspect. In the embodiment of FIG. 4, a new timer is introduced but a SERVICE ACCEPT message is not accepted successfully due to expiration of the timer. In step 411, UE 401 sends a service request to MME 402. UE 401 starts T3417 timer and goes to EMM-SERVICE-REQUEST-INITIATED state. In step 412, UE 401 and MME 402 establish and activate user plane radio bearers. In step 421, UE 401 determines that the service request procedure is completed. UE 401 stops T3417 timer and goes back to EMM-NORMAL-SERVICE state. The service request procedure is determined to be completed when the UE has received a SECURITY MODE COMMAND message or an indication from the lower layers that the user plane radio bearers are set up. UE 401 then starts a new timer $T_{SA}$. The new timer $T_{SA}$ is started upon the determination that the service request procedure is completed and the UE has not yet received a SERVICE ACCEPT during the service request procedure. Timer $T_{SA}$ can be configured with a predefined value of e.g. 5 seconds.

In step 422, timer $T_{SA}$ expires. In step 423, MME 402 detects a reason to send a SERVICE ACCEPT message, e.g., a protocol error in MME. In step 424, MME 402 sends a SERVICE ACCEPT message to UE 401. At this time, timer $T_{SA}$ has already expired. After the expiry of timer $T_{SA}$ or when timer $T_{SA}$ is already stopped/not running, if the UE receives SERVICE ACCEPT message, the message is considered as a message in wrong protocol state. Note that timer $T_{SA}$ is stopped when SERVICE ACCEPT is received or a security protected ESM message or a security protected EMM message not related to an EMM common procedure is received or the UE starts a new service request procedure. As a result, in step 431, UE 401 receives the SERVICE ACCEPT message in wrong protocol state and causes a protocol error. In step 432, UE 401 sends an EMM error status to MME 402. In this embodiment, because MME 402 sends the SERVICE ACCEPT message after the completion of the service request procedure and after the expiry of timer $T_{SA}$, UE 401 receives the message in wrong protocol state.

Instead of relying on a new timer, an existing timer T3417 or T3417ext can be used to define the allowed time window for the reception of SERVICE ACCEPT. Traditionally, timer T3417 is started when service request procedure is initiated and stopped when service request procedure is completed. At timer expiry, the service request procedure is aborted. The operation of timer T3417 can be modified to define the allowed time window for the reception of SERVICE ACCEPT. Specifically, timer T3417 is not stopped at the reception of SECURITY MODE COMMAND message or an indication from the lower layers that the user plane radio bearers are set up. While timer T3417 is running, the SERVICE ACCEPT can be successfully received and treated and does not cause protocol error. Timer T3417 or T3417ext can be configured with a predefined value, e.g., 5 seconds by the network.

Figure 5:
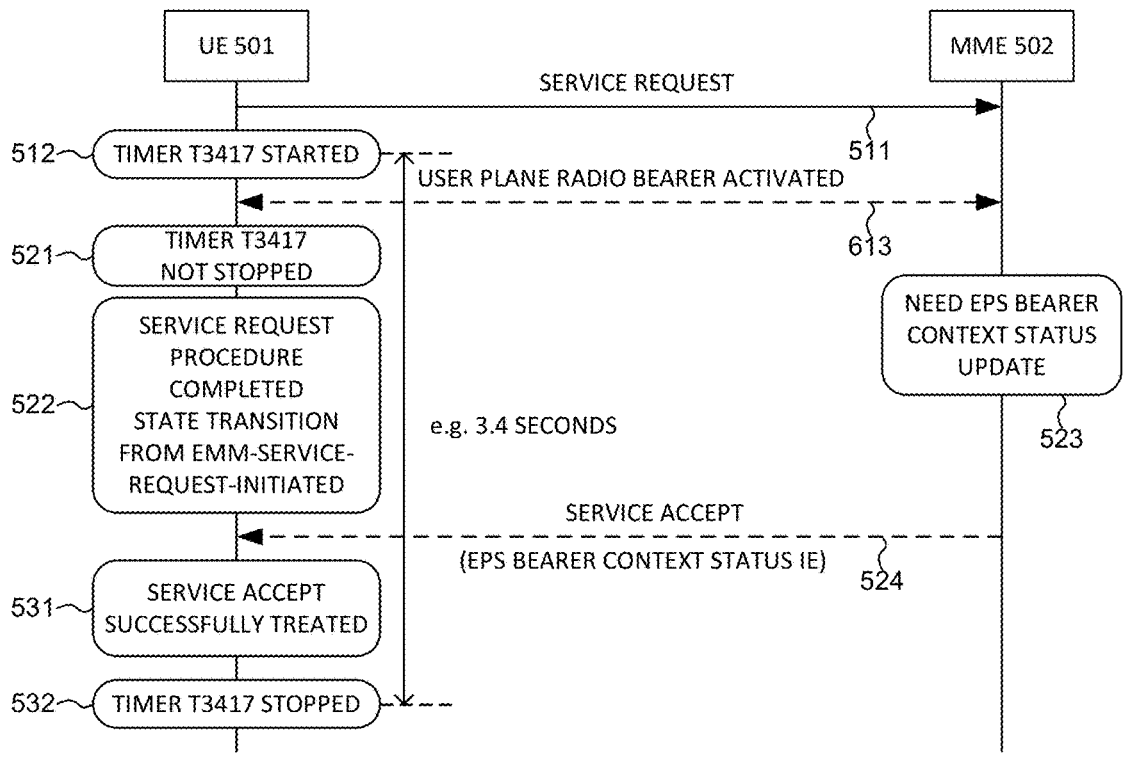
FIG. 5 illustrates a first embodiment of utilizing an existing timer for reception of SERVICE ACCEPT in accordance with one novel aspect.

FIG. 5 illustrates a first embodiment of utilizing an existing timer for reception of SERVICE ACCEPT in accordance with one novel aspect. In step 511, UE 501 sends a service request to MME 502. In step 512, timer T3417 is started and UE 501 goes to EMM-SERVICE-REQUEST-INITIATED state. In step 513, UE 501 and MME 502 establish and activate user plane radio bearers. In step 522, UE 501 determines that the service request procedure is completed and transitions to EMM-NORMAL-SERVICE state. However, timer T3417 is NOT stopped (step 521) and keeps running. In step 523, MME 502 detects that an EPS bearer context status needs to be updated. In step 524, MME 502 sends a SERVICE ACCEPT message to UE 501 together with the EPS bearer context status IE. At this time, timer T3417 is still running, e.g., for 3.4 seconds. While timer T3417 is still running, the UE treats the SERVICE ACCEPT message as successfully received and the message does not cause protocol error. As a result, in step 531, UE 501 receives the SERVICE ACCEPT message successfully. In step 532, UE 501 stops timer T3417.

Figure 6:
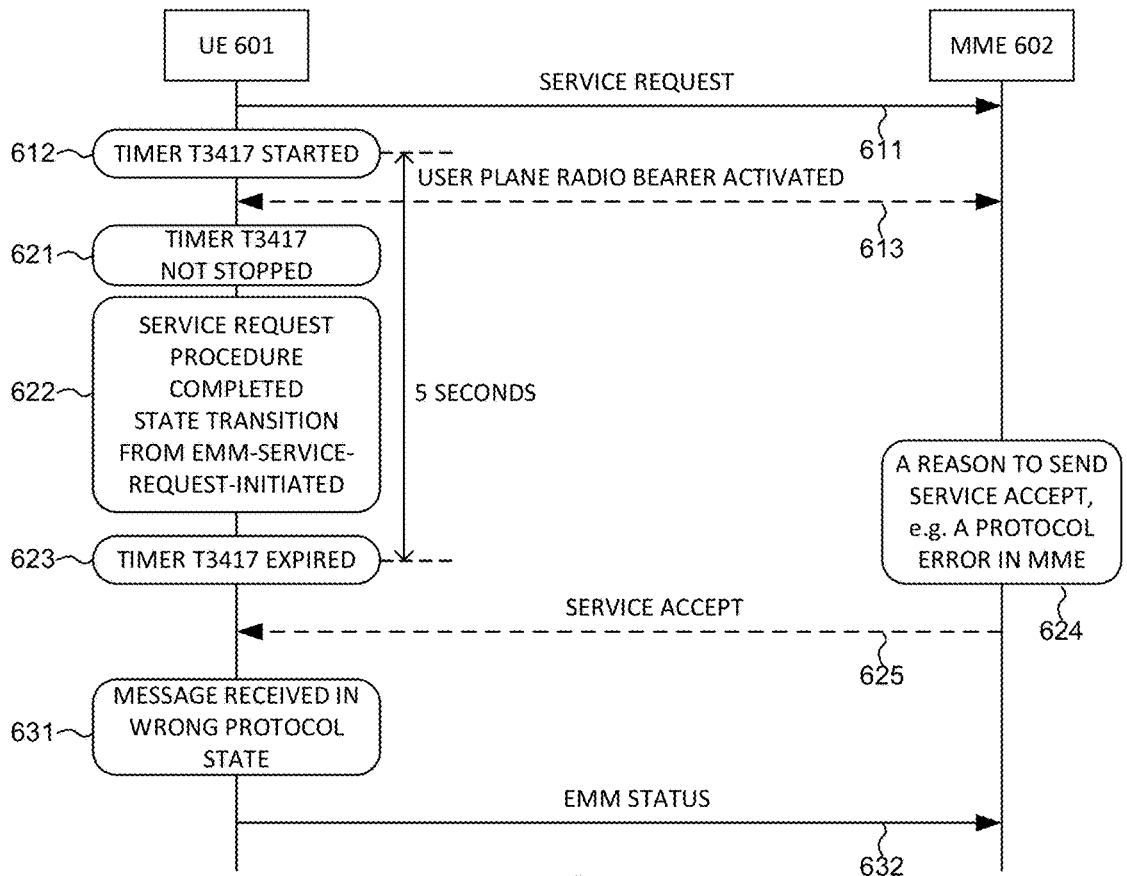
FIG. 6 illustrates a second embodiment of utilizing an existing timer for reception of SERVICE ACCEPT in accordance with one novel aspect.

FIG. 6 illustrates a second embodiment of utilizing an existing timer for reception of SERVICE ACCEPT in accordance with one novel aspect. In step 611, UE 601 sends a service request to MME 602. In step 612, timer T3417 is started and UE 601 goes to EMM-SERVICE-REQUEST-INITIATED state. In step 613, UE 601 and MME 602 establish and activate user plane radio bearers. In step 622, UE 601 determines that the service request procedure is completed and transitions to EMM-NORMAL-SERVICE state. However, timer T3417 is NOT stopped (step 621) and keeps running. In step 623, timer T3417 expires. In step 624, MME 602 detects a reason to send a SERVICE ACCEPT message, e.g., a protocol error in MME. In step 625, MME 602 sends a SERVICE ACCEPT message to UE 601. At this time, timer T3417 has already expired. SERVICE ACCEPT message received after expiration of T3417 triggers protocol error. As a result, in step 631, UE 601 receives the SERVICE ACCEPT message in wrong protocol state and causes a protocol error. In step 632, UE 601 sends an EMM error status to MME 602.

Figure 7:
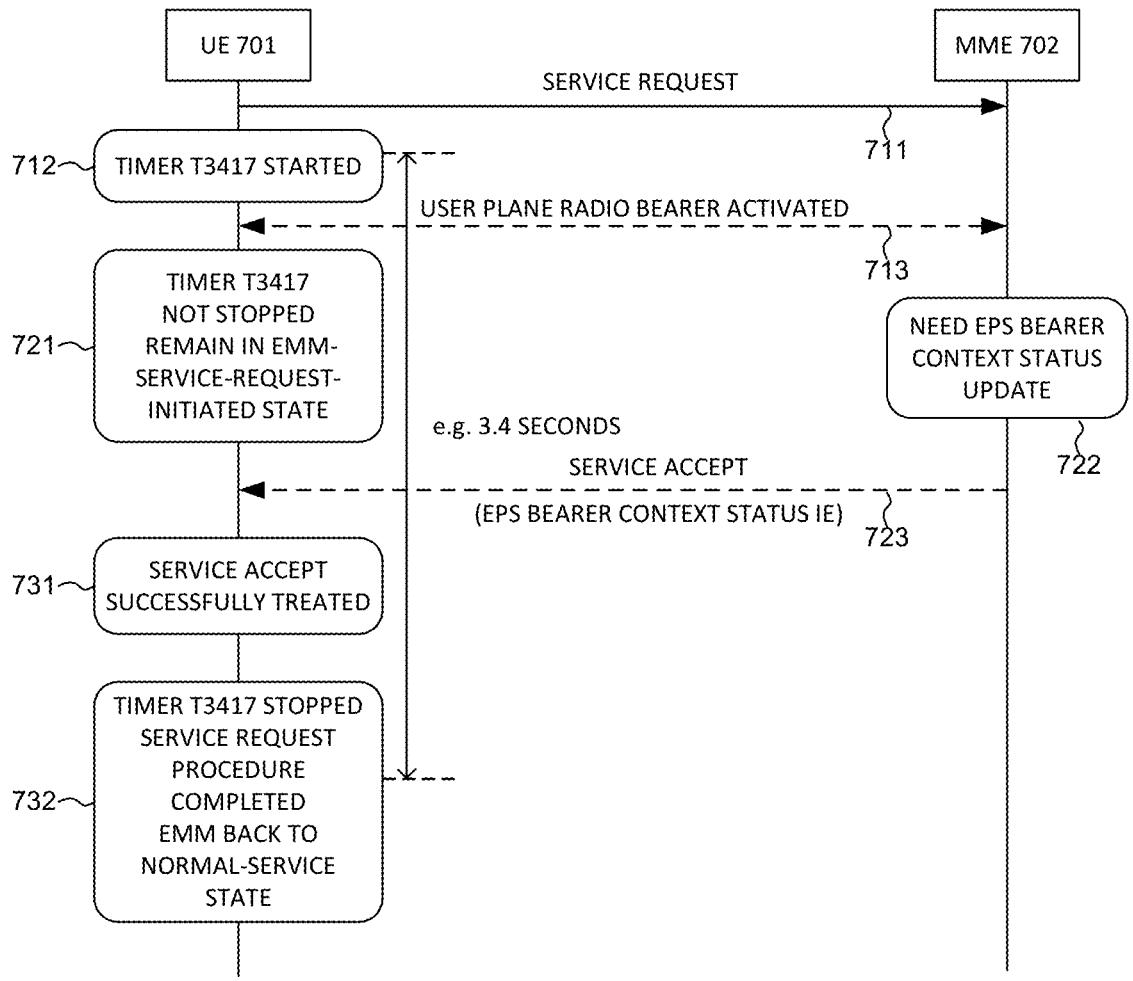
FIG. 7 illustrates a first embodiment of using a new timer or an existing timer for reception of SERVICE ACCEPT in accordance with one novel aspect.

FIG. 7 illustrates a first embodiment of defining a new or an existing timer for reception of SERVICE ACCEPT in accordance with one novel aspect. Either a new timer or modified T3417 defines the allowed time window for reception of SERVICE ACCEPT message. In FIG. 7, modified T3417 is illustrated as an example. In step 711, UE 701 sends a service request to MME 702. In step 712, timer T3417 is started and UE 701 goes to EMM-SERVICE-REQUEST-INITIATED state. In step 713, UE 701 and MME 702 establish and activate user plane radio bearers. In step 721, UE 701 receives a SECURITY MODE COMMAND message or an indication from the lower layers that the user plane radio bearers are set up and UE 701 has not received SERVICE ACCEPT during the procedure. However, timer T3417 is NOT stopped, UE 701 stays in EMM-SERVICE-REQUEST-INITIATED state and does NOT consider the service request procedure is completed. If a new timer is defined, the new timer can be started. In step 722, MME 702 detects that an EPS bearer context status needs to be updated. In step 723, MME 702 sends a SERVICE ACCEPT message to UE 701 together with the EPS bearer context status IE. At this time, timer T3417/new timer is still running, e.g., for 3.4 seconds. While timer T3417/new timer is still running, the UE treats the SERVICE ACCEPT message as successfully received and the message does not cause protocol error. As a result, in step 731, UE 701 receives the SERVICE ACCEPT message successfully. In step 732, UE 701 stops timer T3417/new timer. The service request procedure is completed and UE goes back to EMM-NORMAL-SERVICE state.

Figure 8:
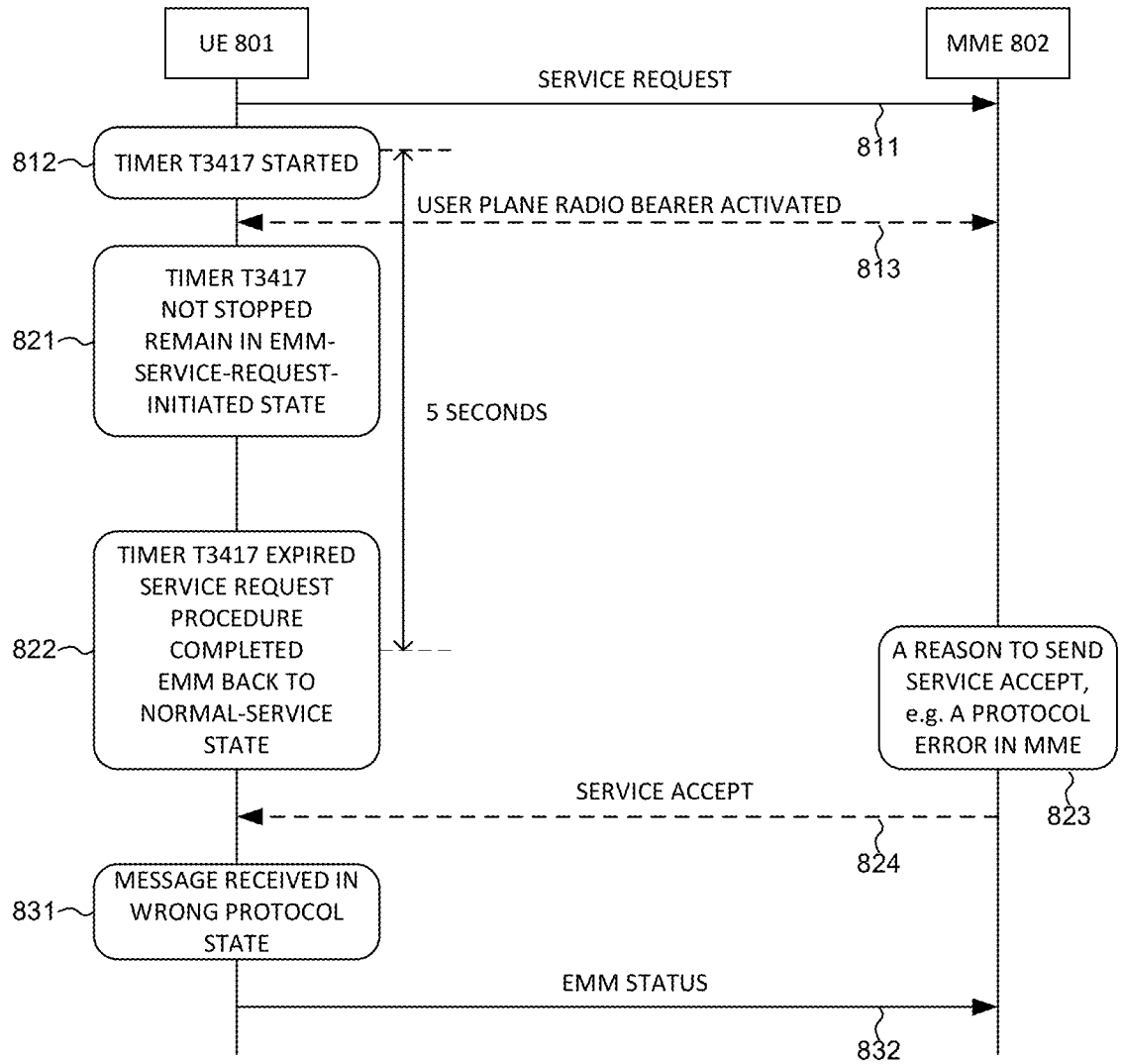
FIG. 8 illustrates a second embodiment of using a new timer or an existing timer for reception of SERVICE ACCEPT in accordance with one novel aspect.

FIG. 8 illustrates a second embodiment of defining a new timer or an existing timer for reception of SERVICE ACCEPT in accordance with one novel aspect. Either a new timer or modified T3417 defines the allowed time window for reception of SERVICE ACCEPT message. In FIG. 8, modified T3417 is illustrated as an example. In step 811, UE 801 sends a service request to MME 802. In step 812, timer T3417 is started and UE 801 goes to EMM-SERVICE-REQUEST-INITIATED state. In step 813, UE 801 and MME 802 establish and activate user plane radio bearers. In step 821, UE 801 receives a SECURITY MODE COMMAND message or an indication from the lower layers that the user plane radio bearers are set up and UE 801 has not received SERVICE ACCEPT during the procedure. However, timer T3417 is NOT stopped, UE 801 stays in EMM-SERVICE-REQUEST-INITIATED state and does NOT consider the service request procedure is completed. If a new timer is defined, the new timer can be started. In step 822, timer T3417/new timer expires. At expiry of T3417/new timer, UE 801 leaves EMM-SERVICE-REQUEST-INITIATED state and considers the service request procedure successfully completed. However, SERVICE ACCEPT message received after expiration of T3417/new timer triggers protocol error. In step 823, MME 802 detects a reason to send a SERVICE ACCEPT message, e.g., a protocol error in MME. In step 824, MME 802 sends a SERVICE ACCEPT message to UE 801. At this time, timer T3417/new timer has already expired. As a result, in step 831, UE 801 receives the SERVICE ACCEPT message in wrong protocol state and causes a protocol error. In step 832, UE 801 sends an EMM error status to MME 802.

Figure 9:
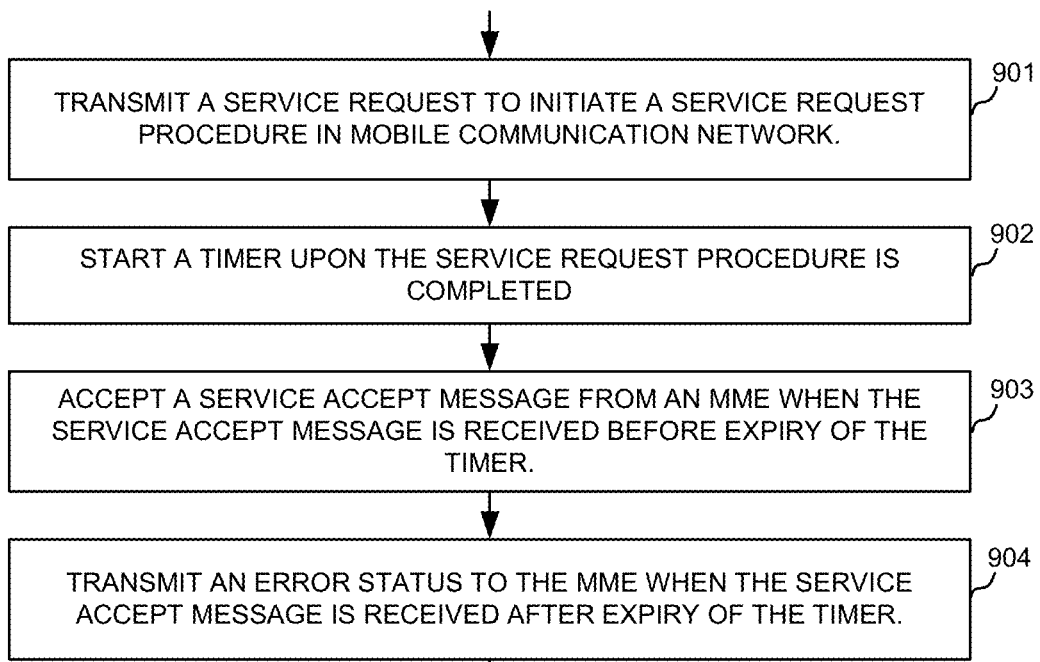
FIG. 9 is a flow chart of a method of reception of standalone SERVICE ACCEPT message using a new timer in accordance with one novel aspect.

FIG. 9 is a flow chart of a method of reception of standalone SERVICE ACCEPT message using a new timer in accordance with one novel aspect. In step 901, a UE transmits a service request to initiate a service request procedure in a mobile communication network. In step 902, the UE starts a timer upon the service request procedure is completed. In step 903, the UE accepts a SERVICE ACCEPT message from a mobility management entity (MME) when the SERVICE ACCEPT message is received before expiry of the timer. In step 904, the UE transmits an error status to the MME when the SERVICE ACCEPT message is received after the expiry of the timer. The UE may stay in a SERVICE-REQUEST-INITIATED state after the service request procedure is completed and before the SERVICE ACCEPT message is received.

Figure 10:
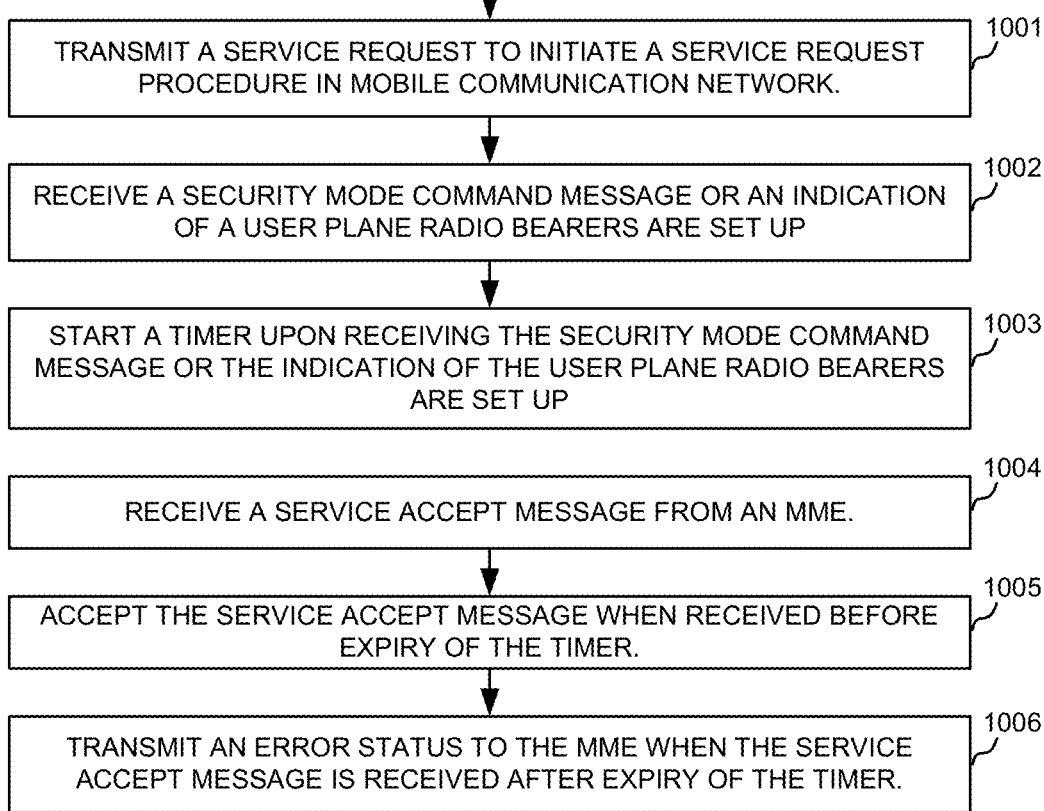
FIG. 10 is a flow chart of a method of reception of standalone SERVICE ACCEPT message using an existing timer in accordance with one novel aspect.

FIG. 10 is a flow chart of a method of reception of standalone SERVICE ACCEPT message using an existing timer in accordance with one novel aspect. In step 1001, a UE transmits a service request to initiate a service request procedure in a mobile communication network. In step 1002, the UE receives a SECURITY MODE COMMAND message or an indication of a user plane radio bearers are set up. In step 1003, the UE starts a timer upon receiving the SECURITY MODE COMMAND message or the indication of the user plane radio bearers are set up. In step 1004, the UE receives a SERVICE ACCEPT message from a mobility management entity (MME). In step 1005, the UE accepts the SERVICE ACCEPT message when received before expiry of the timer. In step 1006, the UE transmits an error status to the MME when the SERVICE ACCEPT message is received after expiry of the timer.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:
1. A method, comprising:
   transmitting a service request by a user equipment (UE) to initiate a service request procedure in a mobile communication network;
   starting a timer upon the service request procedure is completed;

accepting a SERVICE ACCEPT message from a mobility management entity (MME) when the SERVICE ACCEPT message is received before expiry of the timer; and transmitting an error status to the MME when the SERVICE ACCEPT message is received after the expiry of the timer.

2. The method of claim 1, wherein the service request procedure is completed when the UE receives a security protected non-access stratum (NAS) message or an indication that user plane radio bearers are set up.

3. The method of claim 1, further comprising:
accepting an evolved packet system (EPS) bearer context status information element (IE) responsive to the EPS bearer context status IE is received before expiry of the timer.

4. The method of claim 1, further comprising:
going to a NORMAL-SERVICE state upon the service request procedure is completed.

5. The method of claim 1, further comprising:
staying in a SERVICE-REQUEST-INITIATED state after the service request procedure is completed and before the SERVICE ACCEPT message is received.

6. The method of claim 5, further comprising:
going to a NORMAL-SERVICE state and stopping the timer after the SERVICE ACCEPT message is accepted.

7. A User Equipment (UE), comprising:
a transmitter that transmits a service request to initiate a service request procedure in a mobile communication network;
a timer that is started upon the service request procedure is completed;
a receiver that receives and accepts a SERVICE ACCEPT message from a mobility management entity (MME) when the SERVICE ACCEPT message is received before expiry of the timer; and
an error handling circuit that generates and transmits an error status to the MME when the SERVICE ACCEPT message is received after the expiry of the timer.

8. The UE of claim 7, wherein the service request procedure is completed when the UE receives a security protected non-access stratum (NAS) message or an indication that user plane radio bearers are set up.

9. The UE of claim 7, wherein the UE accepts an evolved packet system (EPS) bearer context status information element (IE) responsive to the EPS bearer context status IE is received before expiry of the timer.

10. The UE of claim 7, wherein the UE goes to a NORMAL-SERVICE state upon the service request procedure is completed.

11. The UE of claim 7, wherein the UE stays in a SERVICE-REQUEST-INITIATED state after the service request procedure is completed and before the SERVICE ACCEPT message is received.

12. The UE of claim 11, wherein the UE goes to a NORMAL-SERVICE state and stops the timer after the SERVICE ACCEPT message is accepted.

13. A method, comprising:
transmitting a service request by a user equipment (UE) to initiate a service request procedure in a mobile communication network;
receiving a SECURITY MODE COMMAND message or an indication of a user plane radio bearers are set up;
starting a timer upon receiving the SECURITY MODE COMMAND message or the indication of the user plane radio bearers are set up;
receiving a SERVICE ACCEPT message from a mobility management entity (MME);
accepting the SERVICE ACCEPT message when received before expiry of the timer; and
transmitting an error status to the MME when the SERVICE ACCEPT message is received after expiry of the timer.

14. The method of claim 13, wherein the service request procedure is completed when the UE receives a security protected non-access stratum (NAS) message or the indication of the user plane radio bearers are set up.

15. The method of claim 13, further comprising:
accepting an evolved packet system (EPS) bearer context status information element (IE) responsive to the EPS bearer context status IE is received before expiry of the timer.

16. The method of claim 13, further comprising:
going to a NORMAL-SERVICE state upon completing the service request procedure.

17. The method of claim 13, further comprising:
staying in a SERVICE-REQUEST-INITIATED state after the service request procedure is completed and before the SERVICE ACCEPT message is received.

18. The method of claim 17, further comprising:
going back to a NORMAL-SERVICE state and stopping the timer after the SERVICE ACCEPT message is accepted.

* * * * *